United States Patent
Iverson et al.

(10) Patent No.: US 11,811,959 B2
(45) Date of Patent: Nov. 7, 2023

(54) MIRROR MOUNT FOR ELECTRONIC DEVICE

(71) Applicant: MACNEIL IP LLC, Bolingbrook, IL (US)

(72) Inventors: David S. Iverson, Oak Brook, IL (US); David F. MacNeil, Fort Lauderdale, FL (US)

(73) Assignee: MACNEIL IP LLC, Bolingbrook, IL (US)

( * ) Notice: Subject to any disclaimer, the term of this patent is extended or adjusted under 35 U.S.C. 154(b) by 461 days.

(21) Appl. No.: 17/165,880

(22) Filed: Feb. 2, 2021

(65) Prior Publication Data

US 2022/0247850 A1    Aug. 4, 2022

(51) Int. Cl.
  *H04M 1/06*     (2006.01)
  *F16M 11/04*    (2006.01)

(52) U.S. Cl.
  CPC ............ *H04M 1/06* (2013.01); *F16M 11/041* (2013.01)

(58) Field of Classification Search
  CPC ........ H04M 1/06; H04M 1/04; F16M 11/041; F16M 11/10; F16M 11/105; F16M 13/022
  See application file for complete search history.

(56) References Cited

U.S. PATENT DOCUMENTS

| | | |
|---|---|---|
| 5,195,711 A | 3/1993 | Miller et al. |
| 5,624,064 A | 4/1997 | McGee, Jr. |
| 5,678,793 A | 10/1997 | Hill |
| 2009/0007400 A1* | 1/2009 | Fan ........................ F16M 13/00 |
| | | 24/464 |
| 2015/0282600 A1 | 10/2015 | Richards |

* cited by examiner

*Primary Examiner* — Tuan D Nguyen
(74) *Attorney, Agent, or Firm* — PERKINS IP LAW GROUP LLC; Jefferson Perkins

(57) ABSTRACT

A mount for a handheld electronic device is adapted to be attached to a flat vertical glossy environmental surface, such as a mirror, with suction cups. A shelf with an upwardly concave center section holds electronic devices of various sizes and will hold an electronic device in a vertical orientation even if the mount is attached to the mirror at a small angle to the vertical. The shelf may hold the electronic device in either portrait or landscape orientation. The shelf permits a cable to be plugged into the bottom of the electronic device by being routed through a central notch in the shelf and an opening in a lip.

25 Claims, 8 Drawing Sheets

MIRROR MOUNT FOR ELECTRONIC DEVICE

BACKGROUND OF THE INVENTION

Handheld electronic devices, and particularly cell phones or "smartphones", are now in ubiquitous use. A typical cell phone, in addition to acting like a traditional wireless telephone, is also a text messager, an email client, an Internet browser, a video and audio file player and a videophone, among many other functions. For this reason, many users carry their cell phones everywhere and do not want to be parted from them for even short periods of time.

Ideally, while the user is engaging in another activity such as shaving or applying makeup, the cell phone should be positioned at eye level and in a plane facing the eyes of the user. Cell phones and other handheld electronic devices come in a variety of sizes and a mount ideally should accommodate a range of them. For maximum utility, the mount should be able hold the cell phone in either landscape or portrait orientation, and should be able to safely hold the cell phone even if the user does not attach the mount to the support surface in a strictly vertical attitude. The mount should also accommodate a charging cord for the electronic device.

SUMMARY OF THE INVENTION

According to one aspect of the invention, a mount is provided for a substantially rectangular hand-held electronic device, such as a cell phone. The mount includes a base that is substantially vertically oriented. A plurality of spaced-apart suction cups extend rearwardly from the base. Each of the suction cups is adapted to be affixed to a flat, glossy, substantially vertical environmental surface, such as a mirror. The mount further includes a shelf that extends forwardly from the base to a shelf lip. The shelf lip extends upwardly from the shelf. The shelf has an upper shelf surface. At least a center section of the upper shelf surface is upwardly concave. A depth of the center section and its radius and angular extent are preselected to support opposed corners of a plurality of differently sized, substantially rectangular electronic devices.

According to another aspect of the invention, a mount for a substantially rectangular hand-held electronic device is provided. The device, such as a cell phone, has a display capable of displaying content in either a portrait or a landscape mode and orientation. The mount has a substantially vertically oriented base. A plurality of spaced-apart suction cups extend rearwardly from the base. Each of these suction cups is adapted to be affixed to a glossy, flat, substantially vertical environmental surface, such as a mirror. A shelf extends forwardly from the base to a shelf lip. The shelf lip extends upwardly from the shelf and is disposed to be substantially parallel to the base. An upper shelf surface of the shelf has an upwardly concave center section, a left section that extends leftward from the center section, and a right section that extends rightward from the center section. When the base is oriented vertically, the highest points of the left and right sections are in the same horizontal plane. A depth and a length of the left and right sections are preselected so that the left and right sections may hold the electronic device in the landscape orientation. In one embodiment, the left and right sections are upwardly convex.

In yet another aspect of the invention, a mount for a substantially rectangular electronic device (such as a cell phone) includes a substantially vertically oriented base. A plurality of spaced-apart suction cups extend rearwardly from the base. Each of the suction cups is adapted to be affixed to a glossy, flat and substantially vertical environmental surface, such as a mirror. A shelf extends forwardly from the base to a shelf lip. The shelf lip extends upwardly from the shelf so as to be spaced from the base. A shelf upper surface has at least a center section that is upwardly concave. A depth, radius and angular extent of the center section are preselected such that if the user affixes the base to the environmental surface at an angle to the vertical, where the angle of affixation is preselected from a range of such angles, the center section or shelf more generally nevertheless will be capable of supporting corners of the electronic device in such a way that the electronic device is vertically oriented.

In any of the above aspects, the lip may have a left section disposed adjacent the left end of the shelf, and a right section disposed adjacent the right end of the shelf Inner ends of the left and right sections are spaced apart by an opening formed at the axis of the base. The shelf further has a notch formed at the axis. The opening in the lip, and the notch in the shelf, permit the routing therethrough of a power/communications cable for the electronic device. In one embodiment, the width of the lip opening is many times that of the width of the notch.

In any of the above aspects, the base may comprise a main section and a plurality of suction cup attachment sections that extend from the main section. Rear surfaces of the suction cup attachment sections are forwardly offset from the rear surface of the main section. In use, the rear surface of the main section is disposed near to or abutting the vertical environmental surface. The offset accommodates the thicknesses of the suction cups in the compressed state that they assume when affixed to the environmental surface. The offset, and the positioning of the main section rear surface, cause less travel or displacement of the electronic device when, for example, the user presses on a button or screen on the device's front face.

In any of the above aspects, at least some of the suction cups are upwardly spaced from the shelf by a vertical distance that is at least twice the depth of the upper shelf surface. This reduces or eliminates torque experienced by the upper suction cups around their respective axes; they will experience mostly a vertical load that is easier for the suction cups to withstand.

In any of the above aspects, the base, shelf and lip may be integrally molded from a transparent plastic such as polycarbonate.

BRIEF DESCRIPTION OF THE DRAWINGS

Further aspects of the invention and their advantages can be discerned in the following detailed description as read in conjunction with the drawings of an exemplary embodiment, in which like characters denote like parts and in which.

DETAILED DESCRIPTION

Figure 1:
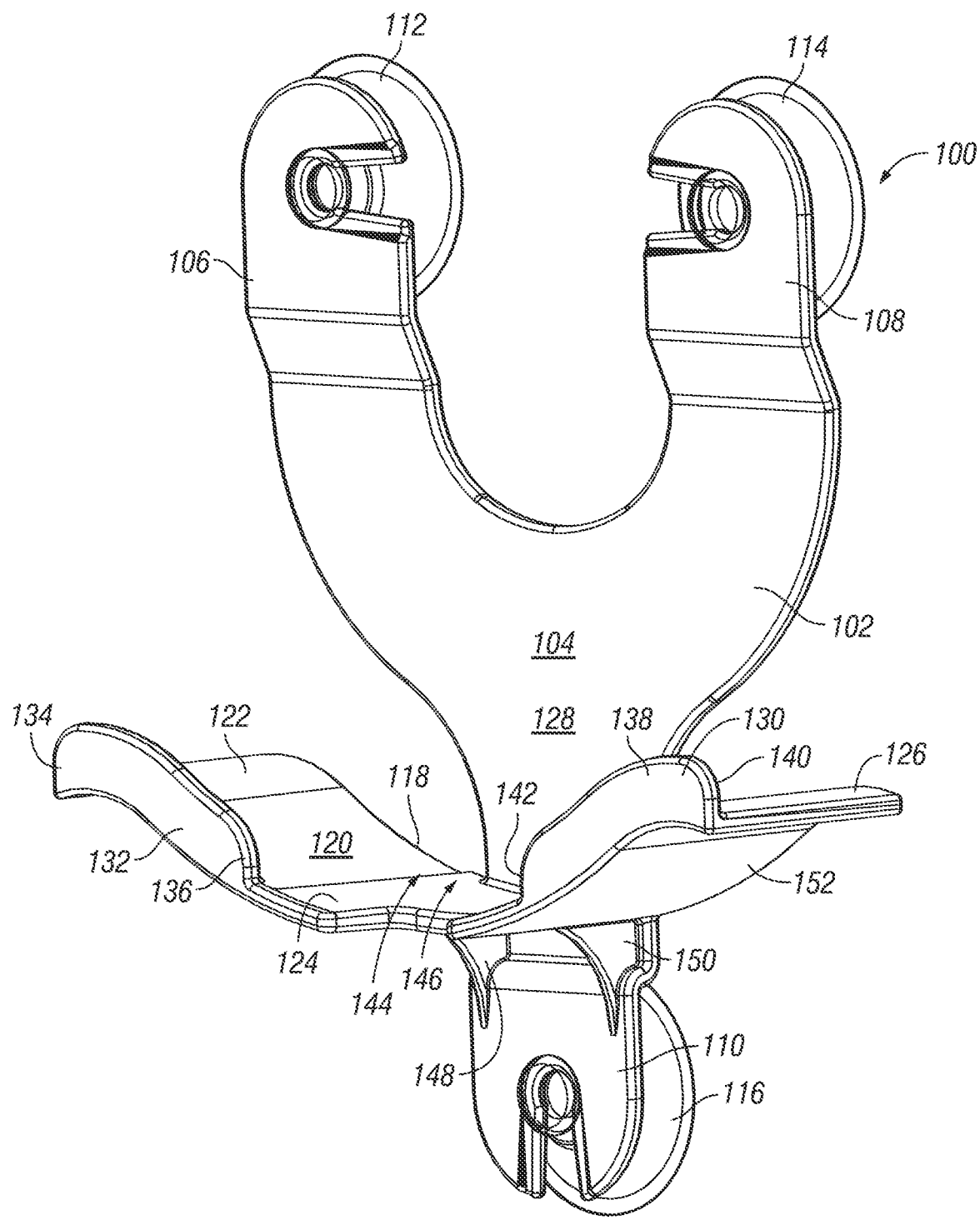
FIG. 1 is a front perspective view of one embodiment of a mount according to the invention.

One embodiment of a mount according to the invention is shown at 100 in FIG. 1. The mount 100 has a base 102 that, in use, is substantially vertically oriented. The base 102 has a main section 104 and, co-molded with it, a plurality of suction cup attachment sections 106, 108 and 110. A plurality of suction cups 112, 114 and 116, one per suction cup attachment section, extend rearwardly from the suction cup attachment sections and are adapted to be affixed to a glossy, flat and substantially vertical environmental surface (see FIGS. 4 AND 7). One such environmental surface can be a mirror. The mount 100 can also be affixed to glazed or polished tiles or other surfaces to which a hermetic suction cup seal can be maintained. In other embodiments, more suction cups and more suction cup attachment sections can be provided.

A shelf 118 extends forwardly from the base 102. The shelf 118 has an upper surface 120 with a left section 122, a center section 124 and a right section 126. The center section 124 is upwardly concave. The shelf upper surface 120 extends from a front surface 128 of the base main section 104 to a lip 130. The lip 130 extends upwardly from shelf upper surface 120, substantially in parallel to but spaced from the front surface 128. The lip 130 has a left section 132 that starts at a left end 134 of the shelf 118 and extends rightwardly to an inner end 136. Similarly, a right section 138 of the lip 130 starts at a right end 140 of the and extends leftwardly to an inner end 142. The inner ends 136 and 142 are laterally spaced apart by an opening 144.

The shelf 118 has a forward-facing, u-shaped notch 146 at its center. A width of the u-shaped notch is many times smaller than the width of the lip opening 144. This is because the lip 130 should only be extensive enough to retain the lower end of the cell phone or other personal electronic device and should not, to the extent possible, occlude the lower end of the front of the held device, which in current versions is occupied almost entirely by a visual display. For this reason also, it is preferred to integrally mold the base 102, shelf 118 and lip 130 from a colorless transparent plastic such as polycarbonate. Also, as so molded, the mount 100 visually will be more innocuous, particularly as mounted on a mirror, a glass window or the like. U-shaped notch 146, on the other hand, need be only large enough to admit to a power/communications cord for connection to the electronic device as will be hereinafter further described.

The shelf 118 is joined to the base 102 at its lower center. The main section 104 of the base 102 may be formed to have distinct arms, as shown, or could take any other convenient shape. A pair of spaced-apart, triangularly shaped, vertically oriented gussets 148, 150 extend from a lower portion of main section 104 and suction cup attachment section 110 to the lower surface 152 of the shelf 118. Gussets 148, 150 help support the weight of shelf 118 and the electronic device.

Figure 2:
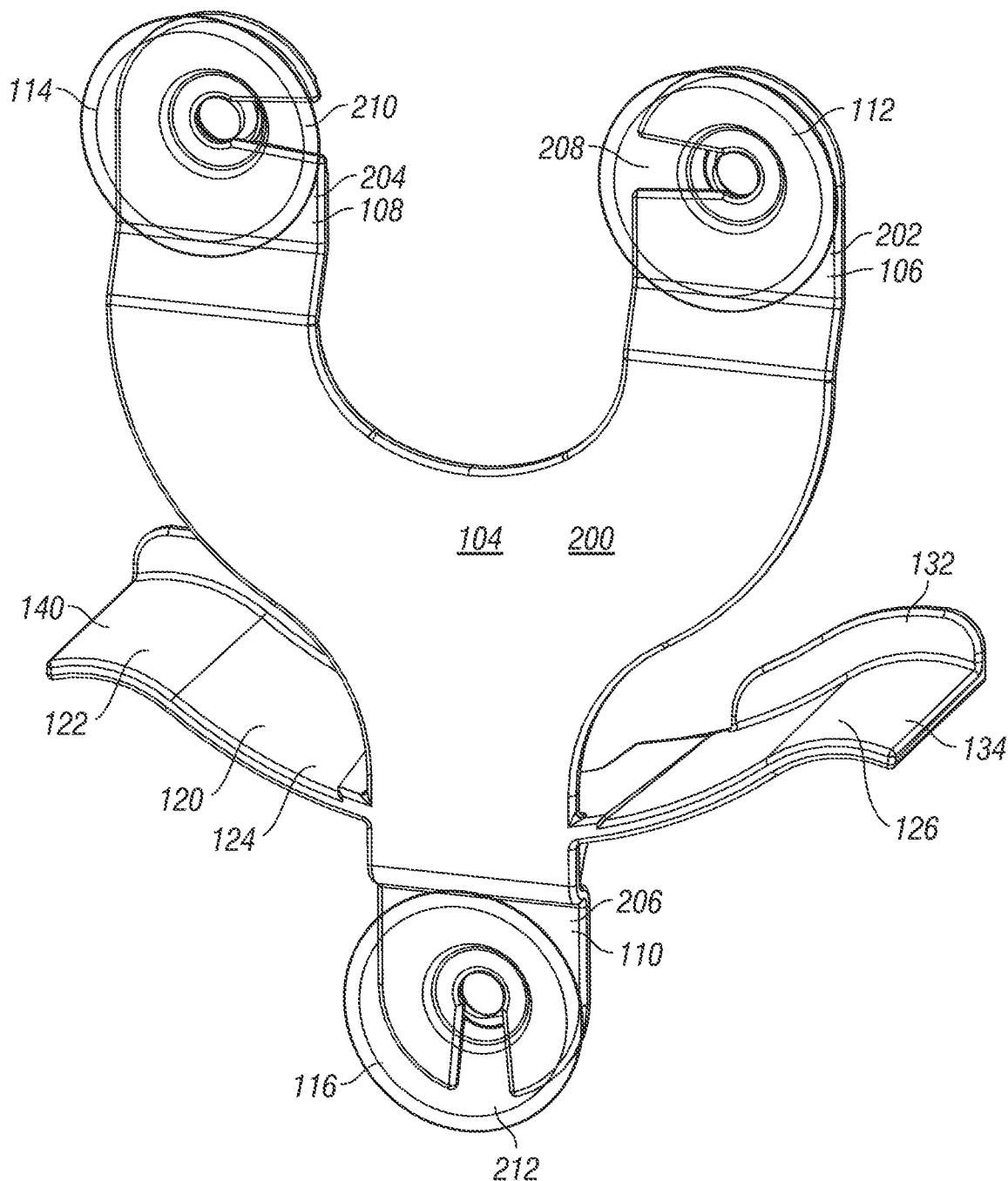
FIG. 2 is a rear perspective view of the mount shown in FIG. 1.

As seen in FIG. 2, the main base section 104 has a rear surface 200 that, in use, is oriented vertically. Rear surfaces 202, 204, 206 of respective suction cup attachment sections 106, 108 and 110 are forwardly offset from surface 200, so as to accommodate a depth of the suction cups 112, 114, 116 in their compressed state.

Suction cup attachment sections 106 and 108 have transversely inwardly facing notches 208 and 210, so that a shank of a respective suction cup can be inserted into each of them with an interference fit. The notches 208, 210 are horizontal so as not to interfere with the transmission of the load from the base 102, and the held electronic device, to the suction cup. A similar notch 212 is pointed downward, because the weight of the base 102 and the held electronic device is all above suction cup 116.

Figure 3:
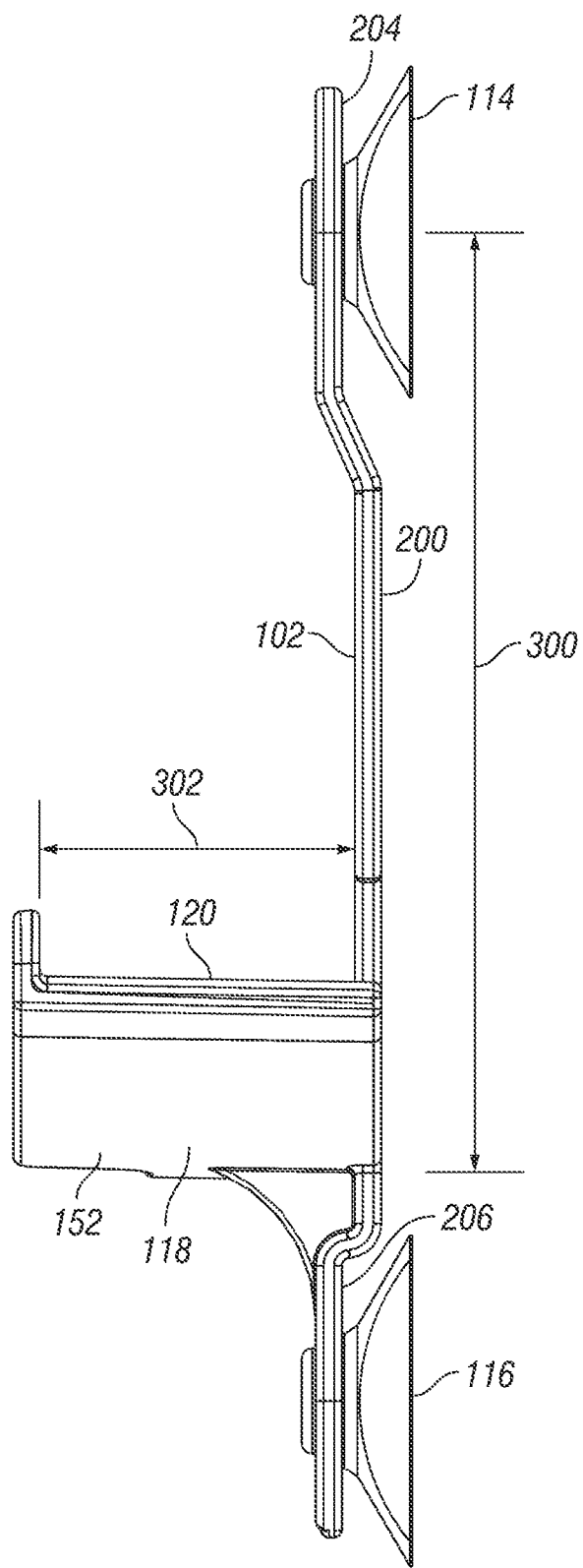
FIG. 3 is a right side view of the mount shown in FIG. 1.

A vertical distance 300 (FIG. 3) between the point of attachment of the shelf 118 to base 102 and the center of upper suction cup 114 (and to the center of upper suction cup 112, occluded in FIG. 3) preferably is many times the uniform depth 302 of the shelf upper surface 120. This will make most of the load on the upper suction cups 112, 114 be a straight downward force, and little of it will be experienced as a torque around the suction cup axes which otherwise would have a tendency to peel the suction cups off of the environmental surface. In FIG. 3, the suction cups 114, 116 are shown in their uncompressed state, in which state they rearwardly extend farther than the position of main section surface 200. The suction cups 112-116 preferably are molded of a clear colorless elastomer.

Figure 4:
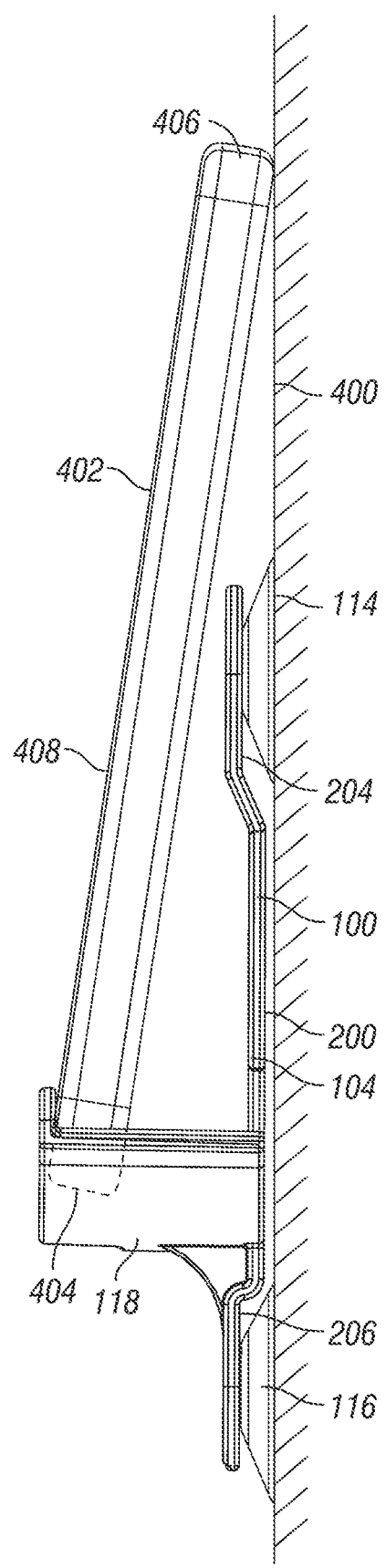
FIG. 4 is right side view of the mount shown in FIG. 1, as shown mounted on a mirror and holding a cell phone in a portrait orientation.

FIG. 4 shows the attachment of mount 100 to a glossy, flat and substantially vertical environmental surface 400, such as a mirror. The suction cups 114 and 116 (and the suction cup 112, occluded in this FIGURE) are in their compressed state that they assume when being deformed by the partial vacuum between their disks and the surface 400. As so attached, the rear surface 200 of main base section 104 is either very close to, or abuts, surface 400. A cell phone 402 is shown being supported in a portrait orientation, with its lower end 404 resting on shelf 118 and its upper end 406 resting on surface 400; the cell phone 402 is leaning rearwardly. In this condition, a user may press any portion of the front face 408 of the cell phone 402, and little or no movement of the cell phone 402 will result.

Figure 5:
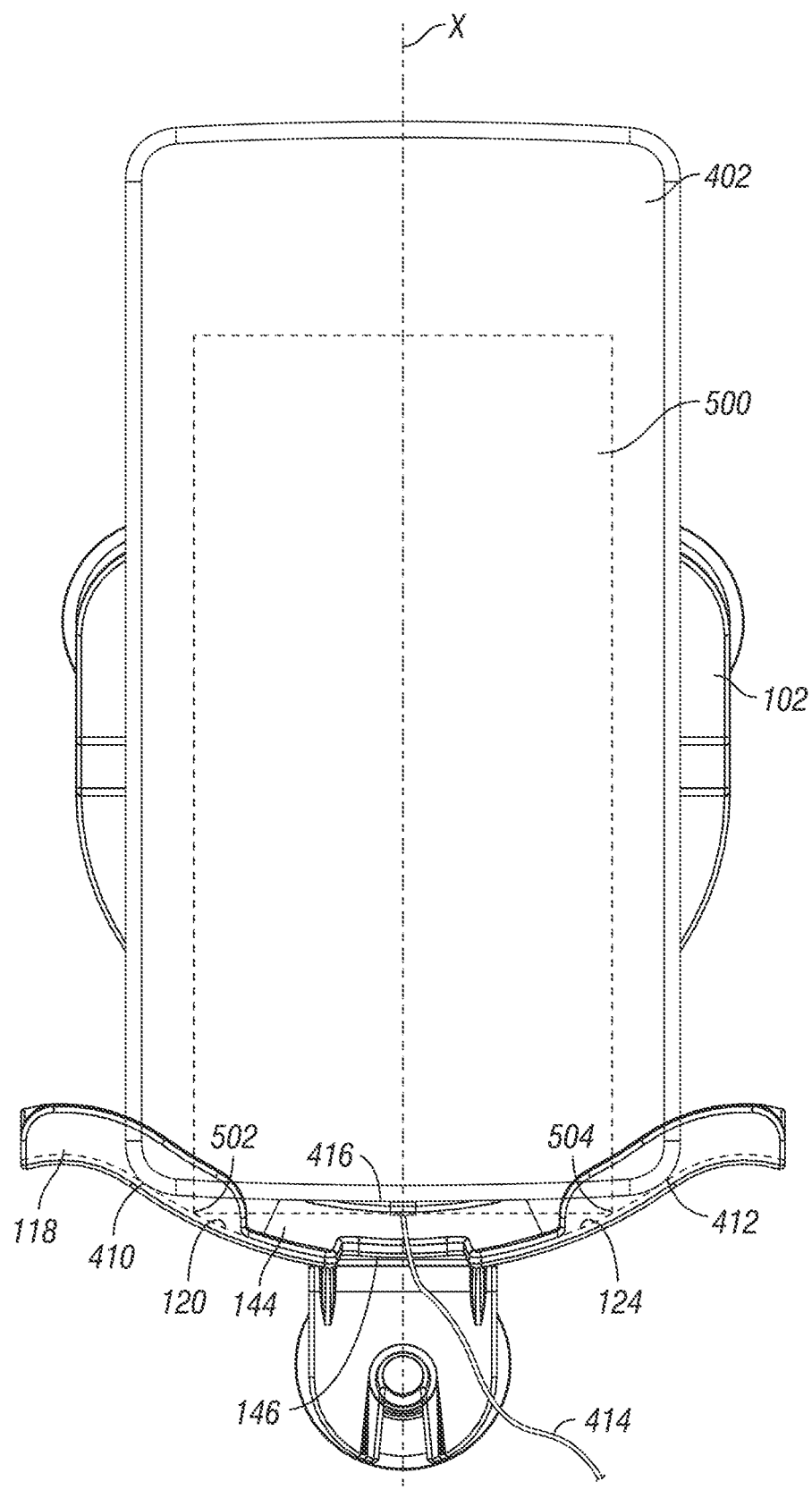
FIG. 5 is a front view of the mount shown in FIG. 1, as shown holding a cell phone in a portrait orientation, a smaller, alternative cell phone being shown in dotted line.

FIG. 5 is a front view of cell phone 402, once again supported in a portrait orientation by shelf 118. In this view the base 102 is oriented vertically on a vertical axis X. The cell phone 402 is a thin rectangle with a width considerably smaller than its height, and a thickness that is much smaller than its width. Both a lower left corner 410 and a lower right corner 412 rest on the center section 124 of the shelf upper surface 120. A power/communications cord 414 is fed through notch 146 and lip opening 144 to be plugged into a port on the bottom side 416 of the cell phone 402. In the embodiment seen here, the lip opening 144 and notch 146 are bilaterally symmetrical around axis X.

Shown in dotted line is a second, alternative, smaller cell phone 500, also being supported in portrait orientation on shelf 118. A lower left corner 502 and a lower right corner 504 rest on center section 124, but at points laterally inward and downward from the points of rest of cell phone corners 410, 412. The upwardly concave shape of center section 124 permits it to securely hold cell phones of various sizes, with some resistance against these phones slipping sideways off of the shelf 118.

Figure 6:
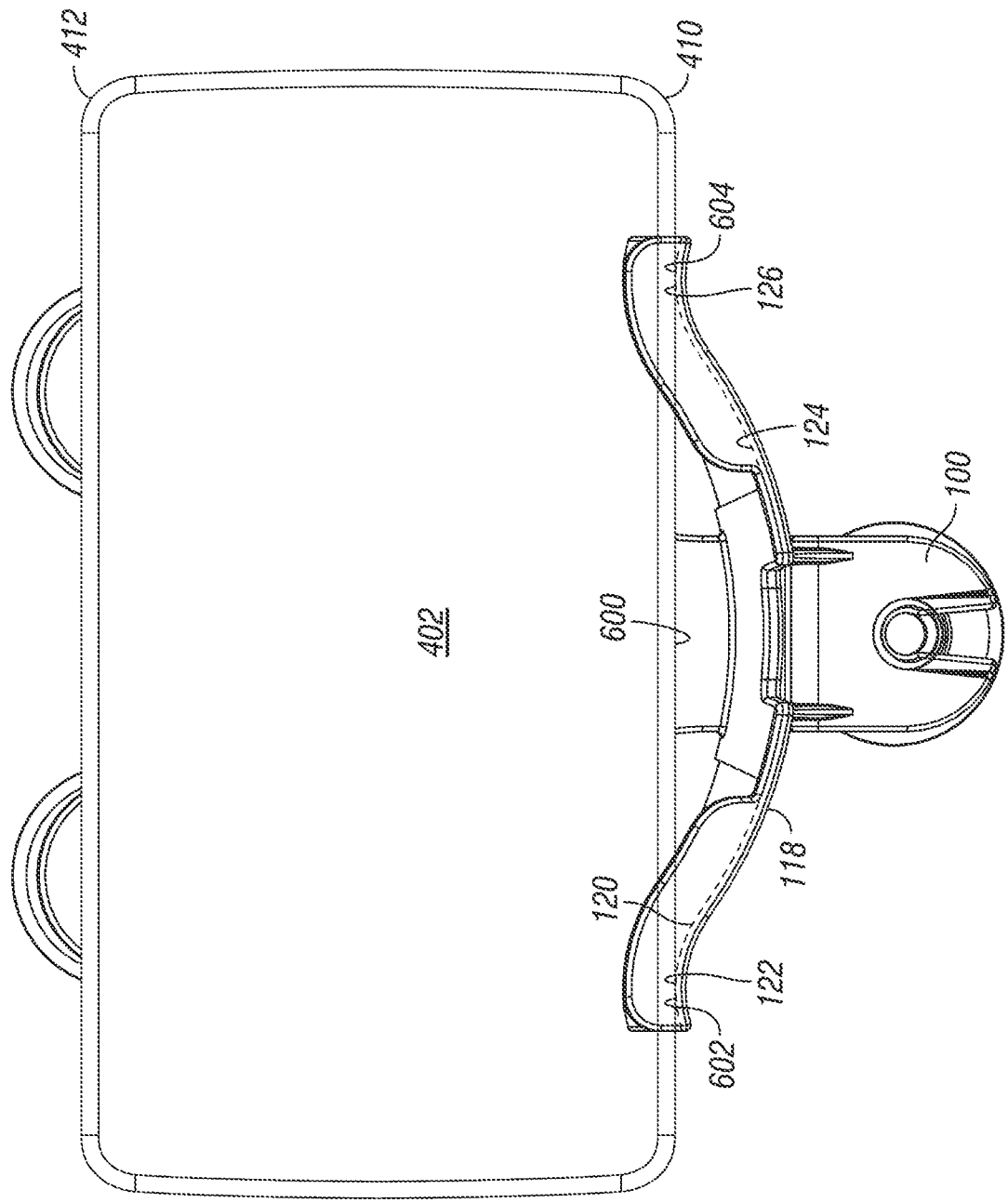
FIG. 6 is a front view of the mount shown in FIG. 1, as shown holding a cell phone in a landscape orientation.

FIG. 6 shows the cell phone 402 being held by mount 100 in a "landscape" orientation. In this orientation, a long side 600 of the cell phone 402 rests on a highest point 602 of the left section 122, and on a highest point 604 of the right shelf surface section 126; these highest points 602, 604 will be in the same horizontal plane when the mount 100 is attached to the environmental surface in a vertical position. In the illustrated embodiment, while center section 124 is upwardly concave, left and right sections 122 and 126 are slightly upwardly convex, the surface smoothly transitioning between concave and convex curves in each case. In another embodiment, the left and right sections 122, 126 may be flat.

Figure 7:
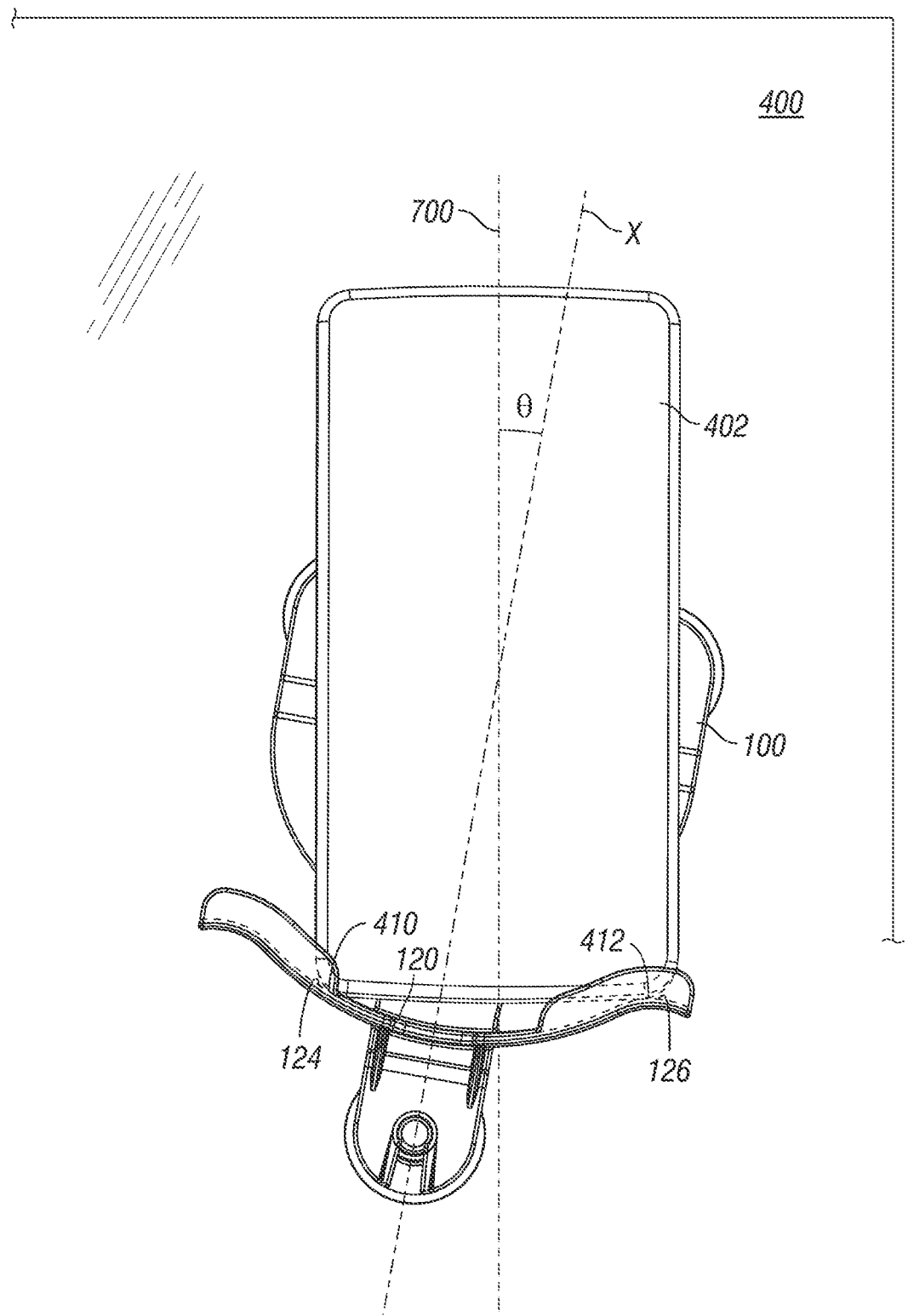
FIG. 7 is a front view of the mount shown in FIG. 1, as shown imperfectly applied to a vertical environmental surface such that the axis of the mount is not aligned to the vertical, but nonetheless supporting a cell phone in a vertical portrait orientation.

FIG. 7 shows a scenario in which the user has not attached the mount 100 onto the environmental surface 400 in a strictly vertical orientation. The axis X of the mount 100 is at an angle θ to a vertical reference 700. The somewhat sloppy attachment of the mount 100 to the surface 400 still does not defeat the ability of the mount 100 to hold phone 402 in a portrait orientation, as long as angle θ falls within a predetermined range. The upwardly concave center section 124 still has left corner 410 resting on it, while the right corner is resting on right section 126. The user uses the concavity of the center section 124 to angularly slide the bottom of phone 402 rightward or leftward until a sufficiently vertical orientation is achieved.

Figure 8:
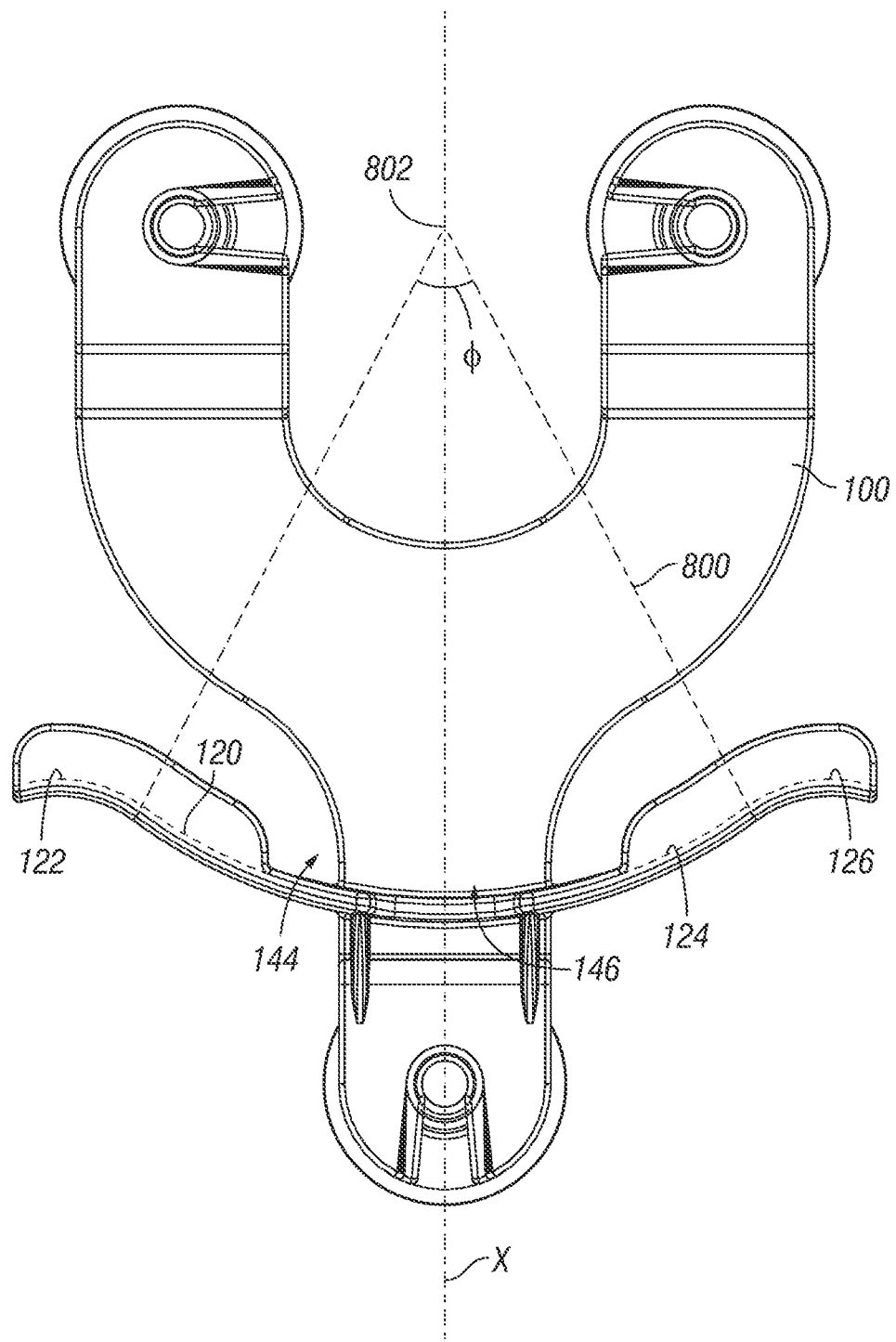
FIG. 8 is a front view of the mount shown in FIG. 1.

FIG. 8 is another front view of the mount 100. The center section 124 may conform to a circular arc having radius 800 and center 802, which is located in an upper direction on axis X. The arc subtends an angle φ. Radius 800 and angle φ are chosen so that a variety of differently sized electronic devices may be supported, and so that some accommodation may be made to the misalignment of the mount 100 to a vertical reference. A depth of the shelf 118 should also be large enough that the electronic device will be able to lean back when held by mount 100.

In summary, a mount for holding a handheld electronic device on a flat glossy surface such as a mirror has been illustrated and described. At least a center section of the supporting shelf is upwardly concave, so as to permit a misalignment of the mount on the vertical environmental surface and/or the holding of electronic devices of different sizes. While an illustrated embodiment of the present invention has been described and illustrated in the appended drawings, the present invention is not limited thereto but only by the scope and spirit of the appended claims.

We claim:

1. A mount for a substantially rectangular hand-held electronic device, the mount comprising:
    a substantially vertically oriented base;
    a plurality of spaced-apart suction cups extending rearwardly from the base, each of the suction cups adapted to be affixed to a flat, glossy, substantially vertical environmental surface; and
    a shelf extending forwardly from the base to a shelf lip, the shelf lip oriented vertically and extending upwardly from the shelf, the shelf having an upper shelf surface, at least a center section of the upper shelf surface being upwardly concave, the upper shelf surface having a depth from the base to the shelf lip, the depth, a radius of the center section and an angular extent of the center section being preselected to support opposed corners of a plurality of substantially rectangular electronic devices of different sizes.

2. The mount of claim 1, wherein the environmental surface is a mirror.

3. The mount of claim 1, wherein the handheld electronic device is a cell phone.

4. The mount of claim 1, wherein the base is formed on a vertical axis, the shelf transversely extending from the axis to a left end and transversely extending from the axis to a right end opposed to the left end, the lip having a left section disposed adjacent the left end of the shelf and extending rightwardly therefrom to an inner left lip end, a right section of the lip disposed adjacent the right end of the shelf and extending leftwardly therefrom to an inner right lip end, the inner left lip end and the inner right lip end being spaced from each other by a lip opening formed at the axis, an open notch formed in the shelf at the axis, the open notch and the lip opening accommodating an electrical cable for connecting to the electronic device.

5. The mount of claim 4, wherein the lip opening and the notch each have a width in a horizontal direction, the width of the lip opening being many times the width of the notch.

6. The mount of claim 1, wherein the base includes a main section and a plurality of suction cup attachment sections extending from the main section, each of the plurality of suction cups being affixed to and extending rearwardly from a corresponding one of the suction cup sections, the main section having a rear surface adapted to be near to or abutting the environmental surface, each suction cup attachment section having a rear surface, each suction cup having an uncompressed state and a compressed, environmental surface-engaging state, the rear surface of each suction cup attachment section being forwardly offset from the rear surface of the main section so as to accommodate a depth of the corresponding suction cup in its compressed, environmental surface-engaging state.

7. The mount of claim 1, wherein the shelf joins the base at a first vertical position, at least some of the suction cups being upwardly spaced from the first vertical position by a distance that is at least twice the depth of the upper shelf surface.

8. The mount of claim 1, wherein the base, shelf and lip are integrally molded from a transparent plastic.

9. A mount for a substantially rectangular hand-held electronic device having a display capable of displaying content in a portrait orientation and in a landscape orientation, the mount comprising:
    a substantially vertically oriented base;
    a plurality of spaced-apart suction cups extending rearwardly from the base, each suction cup adapted to be affixed to a glossy, flat, substantially vertical environmental surface;
    a shelf extending forwardly from the base to a shelf lip, the shelf lip extending upwardly from the shelf and disposed to be substantially in parallel to the base; wherein
    an upper shelf surface of the shelf has an upwardly concave center section, a left section extending leftward from the center section and a right section extending rightward from the center section, the left and right sections each having a highest point, the highest points of the left and right sections being in the same horizontal plane when the base is oriented vertically, a depth and a length of the right and left sections being preselected in order that the left and right sections may hold the electronic device in the landscape orientation.

10. The mount of claim 9, wherein the left and right sections are upwardly convex.

11. The mount of claim 9, wherein the environmental surface is a mirror.

12. The mount of claim 9, wherein the handheld electronic device is a cell phone.

13. The mount of claim 9, wherein the base is formed on a vertical axis, the shelf transversely extending from the axis to a left end and transversely extending from the axis to a right end opposed to the left end, the lip having a left section disposed adjacent the left end of the shelf and extending rightwardly therefrom to an inner left lip end, a right section of the lip disposed adjacent the right end of the shelf and extending leftwardly therefrom to an inner right lip end, the inner left lip end and the inner right lip end being spaced from each other by a lip opening formed at the axis, an open notch formed in the shelf at the axis, the open notch and the lip opening accommodating an electrical cable for connecting to the electronic device.

14. The mount of claim 13, wherein the lip opening and the notch each have a width in a horizontal direction, the width of the lip opening being many times the width of the notch.

15. The mount of claim 9, wherein the base includes a main section and a plurality of suction cup attachment sections extending from the main section, each of the plurality of suction cups being affixed to and extending rearwardly from a corresponding one of the suction cup sections, the main section having a rear surface adapted to be near to or abutting the environmental surface, each suction cup attachment section having a rear surface, each suction cup having an uncompressed state and a compressed, environmental surface-engaging state, the rear surface of each suction cup attachment section being forwardly offset from the rear surface of the main section so as to accommodate a depth of the corresponding suction cup in its compressed, environmental surface-engaging state.

16. The mount of claim 9, wherein the shelf joins the base at a first vertical position, at least some of the suction cups being upwardly spaced from the first vertical position by a distance that is at least twice the depth of the upper shelf surface.

17. The mount of claim 9, wherein the base, shelf and lip are integrally molded from a transparent plastic.

18. A mount for a substantially rectangular electronic device, the mount comprising:
a substantially vertically oriented base;
a plurality of spaced-apart suction cups extending rearwardly from the base, each suction cup adapted to be affixed to a glossy, flat and substantially vertical environmental surface;
a shelf extending forwardly from the base to a shelf lip, the shelf lip extending upwardly from the shelf so as to be spaced from the base;
a shelf upper surface having at least a center section that is upwardly concave, a depth and a radius and angular extent of the center section preselected such that if the base is affixed to the environmental surface so as to be oriented at an angle to the vertical selected from a predetermined range of such angles, the center section will nonetheless be capable of supporting corners of the electronic device in such a way that the electronic device is in a vertical orientation.

19. The mount of claim 18, wherein the environmental surface is a mirror.

20. The mount of claim 18, wherein the handheld electronic device is a cell phone.

21. The mount of claim 18, wherein the base is formed on a vertical axis, the shelf transversely extending from the axis to a left end and transversely extending from the axis to a right end opposed to the left end, the lip having a left section disposed adjacent the left end of the shelf and extending rightwardly therefrom to an inner left lip end, a right section of the lip disposed adjacent the right end of the shelf and extending leftwardly therefrom to an inner right lip end, the inner left lip end and the inner right lip end being spaced from each other by a lip opening formed at the axis, an open notch formed in the shelf at the axis, the open notch and the lip opening accommodating an electrical cable for connecting to the electronic device.

22. The mount of claim 21, wherein the lip opening and the notch each have a width in a horizontal direction, the width of the lip opening being many times the width of the notch.

23. The mount of claim 18, wherein the base includes a main section and a plurality of suction cup attachment sections extending from the main section, each of the plurality of suction cups being affixed to and extending rearwardly from a corresponding one of the suction cup sections, the main section having a rear surface adapted to be near to or abutting the environmental surface, each suction cup attachment section having a rear surface, each suction cup having an uncompressed state and a compressed, environmental surface-engaging state, the rear surface of each suction cup attachment section being forwardly offset from the rear surface of the main section so as to accommodate a depth of the corresponding suction cup in its compressed, environmental surface-engaging state.

24. The mount of claim 18, wherein the shelf joins the base at a first vertical position, at least some of the suction cups being upwardly spaced from the first vertical position by a distance that is at least twice the depth of the upper shelf surface.

25. The mount of claim 18, wherein the base, shelf and lip are integrally molded from a transparent plastic.

* * * * *